United States Patent
Schell

(12) United States Patent    (10) Patent No.: US 8,074,170 B2
Schell    (45) Date of Patent: Dec. 6, 2011

(54) METHODS AND COMPUTER PROGRAM PRODUCTS THAT CONDITIONALLY ROUTE PRINT FILES

(75) Inventor: Harry Michael Schell, Brandon, MS (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1858 days.

(21) Appl. No.: 10/627,110

(22) Filed: Jul. 25, 2003

(65) Prior Publication Data
US 2005/0018238 A1    Jan. 27, 2005

(51) Int. Cl.
*G06F 17/00* (2006.01)
(52) U.S. Cl. ........................... 715/255; 715/274
(58) Field of Classification Search ............ 709/238; 707/6; 715/500, 530, 255, 274
See application file for complete search history.

(56) References Cited

U.S. PATENT DOCUMENTS

| | | | |
|---|---|---|---|
| 6,836,477 B1* | 12/2004 | West et al. | 370/352 |
| 6,906,817 B1* | 6/2005 | Berard et al. | 358/1.15 |
| 2002/0052873 A1* | 5/2002 | Delgado et al. | 707/7 |
| 2002/0123999 A1* | 9/2002 | Bankert et al. | 707/10 |
| 2003/0137690 A1* | 7/2003 | Hoover et al. | 358/1.15 |
| 2004/0001223 A1* | 1/2004 | Tanaka | 358/1.15 |
| 2004/0030921 A1* | 2/2004 | Aldridge et al. | 713/200 |
| 2004/0083273 A1* | 4/2004 | Madison et al. | 709/217 |
| 2004/0161080 A1* | 8/2004 | Digate et al. | 379/88.17 |

OTHER PUBLICATIONS

Microsoft Computer Dictionary, Fifth Edition, Microsoft Press, 2002, pp. 273.*
Xu, Jian, et al, "Database Selection Techniques for Routing Bibliographic Queries", Proceedings of the Third ACM Conference on Digital Libraries, May 1998, pp. 264-273.*
Luo, Mon-Yen, et al, "Web and E-Business Application: Content Management on Server Farm with Layer-7 Routing", Proceedings of the 2002 ACM Symposium on Applied Computing, Mar. 2002, pp. 1134-1139.*
Microsoft Computer Dictionary, Fifth Edition, Microsoft Press, 2002, pp. 269 and 273.*
Grigonis, Richard "Zippy", "The Many Faces of Fax Personalities", downloaded from http://www.cconvergence.com/shared/printableArticle.jhtml?articleID=8701349, pp. 1-8.*

* cited by examiner

*Primary Examiner* — Laurie Ries
(74) *Attorney, Agent, or Firm* — Myers Bigel Sibley & Sajovec, P.A.

(57) ABSTRACT

A method of routing print files in a computer system. The content of a print file is evaluated based on a routing policy. The print file is then selectively routed based on that evaluation.

19 Claims, 4 Drawing Sheets

METHODS AND COMPUTER PROGRAM PRODUCTS THAT CONDITIONALLY ROUTE PRINT FILES

FIELD OF THE INVENTION

This invention relates generally to data processing systems and, more particularly, to management of print files in a data processing system.

BACKGROUND OF THE INVENTION

Some computer applications provide users with limited options for how information is to be output, and sometimes information can only be printed from an application. Information that is output by an application for printing is usually electronically stored as a print file, which is then provided to a print server. For example, network printing systems generally include printers, client computers, print servers, and other components that are connected over a network. A print file is assembled on a client computer and transmitted over the network to a print server that is connected to a variety of printers. The printers may have different print capabilities. Thus, for a given submitted print file, some printers in the network may not be able to process the print file. Print files from one or more applications may be held in a print queue on the print server until appropriate printers are available and the information is successfully printed.

Once the information has been printed, the ability to distribute that information and to use some or all of it in other applications may be limited by the amount of information that must be copied and distributed and/or that must be manually input into the other applications.

SUMMARY OF THE INVENTION

Embodiments of the present invention provide methods and computer program products for routing print files in a computer system. The content of a print file is evaluated based on a routing policy. The print file is then selectively routed based on that evaluation. Evaluation of a print file may include comparing the content of the print file to keywords and/or data structures that are defined by the routing policy. Based on the comparison, the print file may be renamed, made accessible to devices on a computer network, posted on a WEB page, and/or emailed to users based on the routing policy. Also based on the comparison, information from the print file may be transferred to another file and/or transferred to fields in a report based on the routing policy.

DETAILED DESCRIPTION

Figure 1:
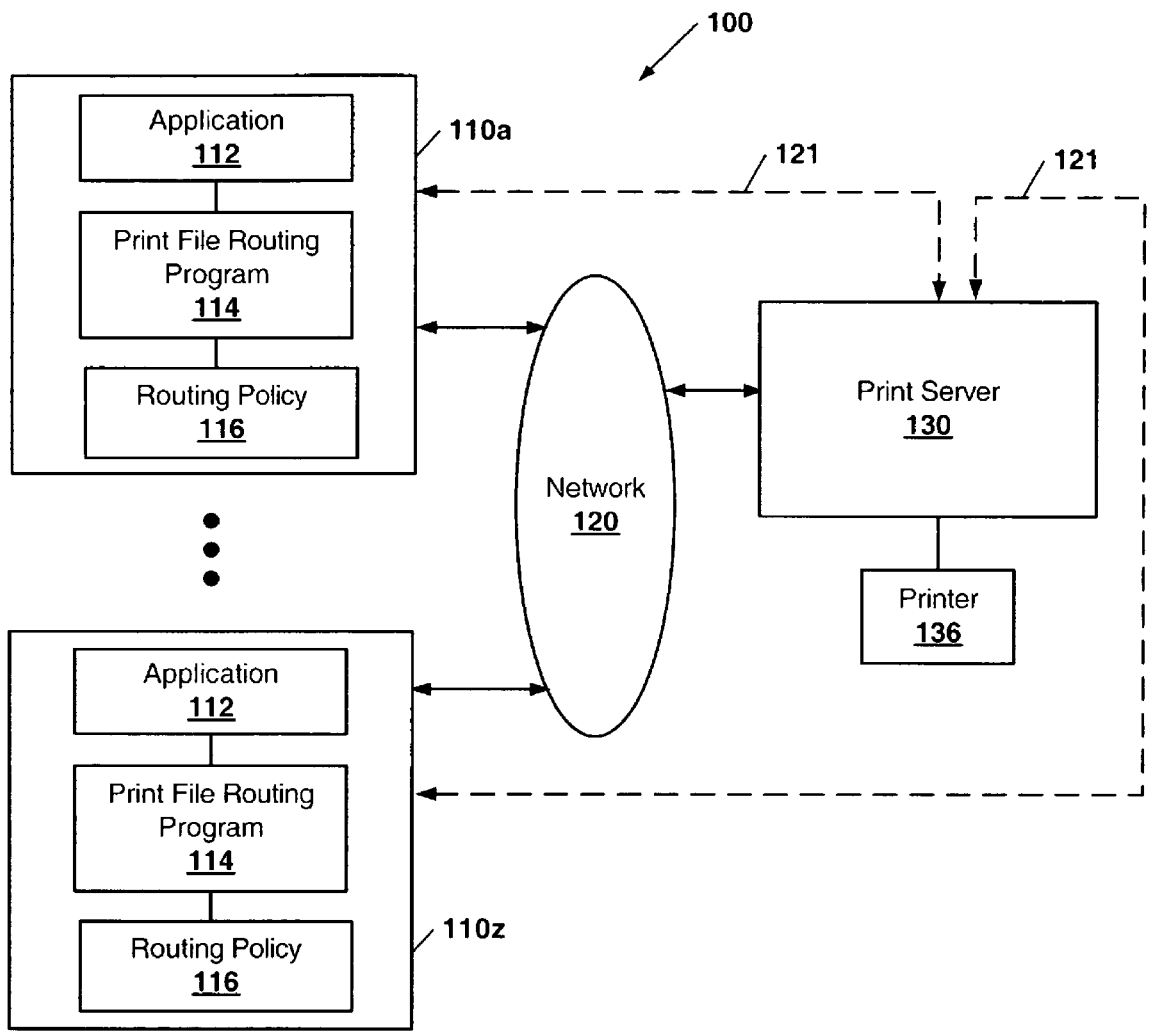
FIG. 1 is a block diagram of a computer system according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numerals refer to like elements throughout.

As will be appreciated by one of skill in the art, the present invention may be embodied as a method, computer system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 illustrates a computer system 100 according to various embodiments of the present invention that includes a plurality of data processing systems 110a-z and a print server 130, which are interconnected by one or more networks 120 and/or by direct connections 121. The network 120 may be, for example, a wired and/or wireless local area network and/or wide area network. The data processing systems 110a-z include one or more applications 112, a print file routing program 114, and a routing policy 116. It is to be understood that one or more of the data processing systems 110a-z may be configured to be stand-alone without a connection to the network 120 or the printer server 130.

Information that is output by the application 112 is electronically stored as a print file. The print file routing program 114 evaluates the content of the print file based on the routing policy 116, and selectively routes the print file based on the evaluation.

The print file routing program 114 may search the print file for one or more keywords that are defined by the routing policy 116. The keywords may be, for example, strings of characters. The print file routing program 114 may also, or may alternatively, compare the contents of the print file to one or more data structures that are defined by the routing policy 116. The data structures may define expected characteristics of a print file, such as, for example, relative locations and/or lengths of strings of characters in the print file. The routing policy 116 may be defined, for example, in an initialization (INI) file that is provided by the Windows operating system, and which can be accessed by the print file routing program 114.

Figure 2:
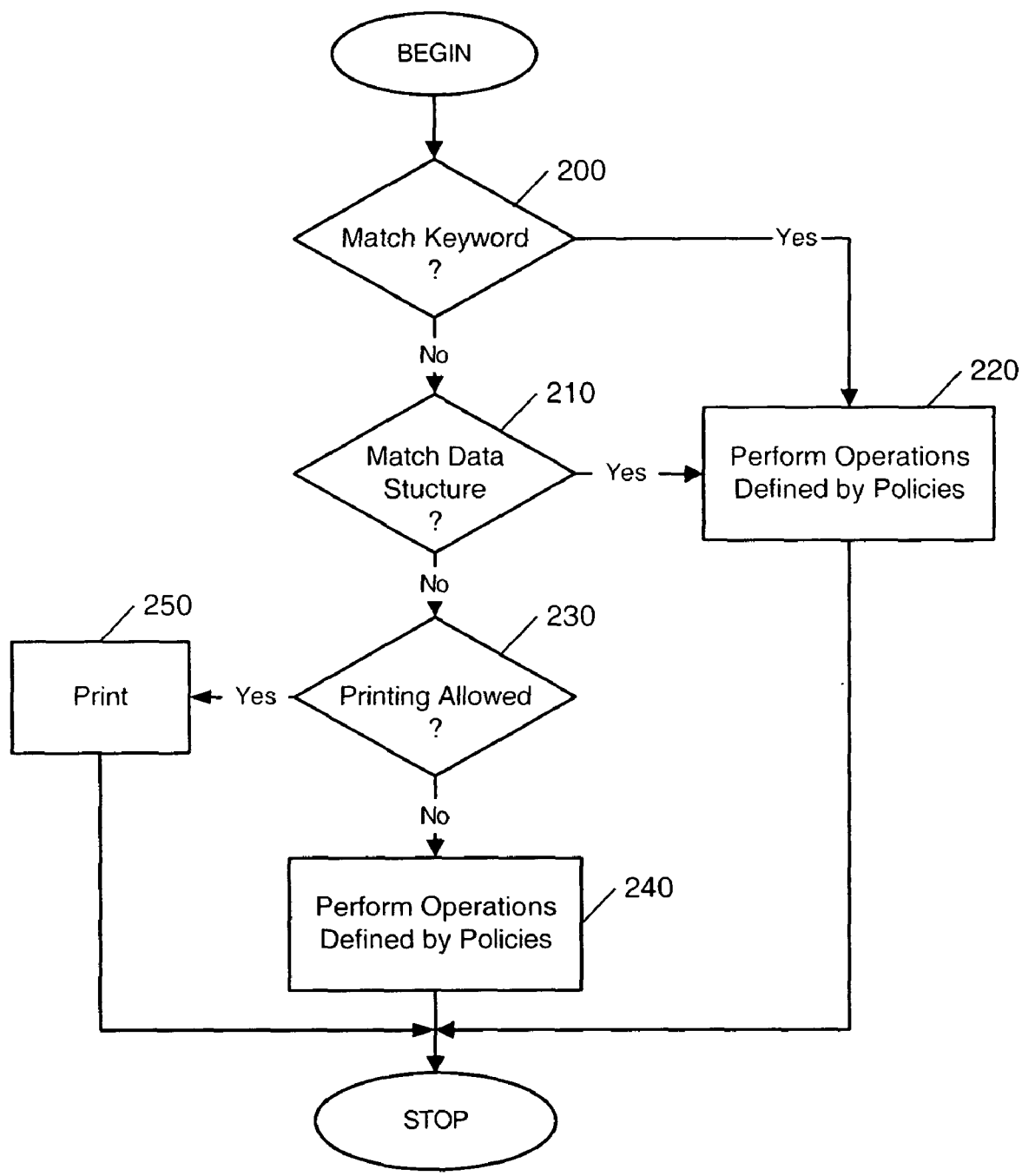
FIG. 2 is a flowchart that illustrates operations for routing print files according to embodiments of the present invention.

The print file routing program 114 conditionally performs operations on the print file based on whether the print file satisfies one or more policies that are defined by, for example, the routing policy 116. FIG. 2 illustrates exemplary operations that may be performed by, for example, the print file routing program 114 of FIG. 1. At Block 200, the print file is searched for one or more keywords that are defined by the policies. If the keywords are not found, then at Block 210, the contents of the print file are compared to one or more data structures that are defined by the policies. If the keywords are found at Block 200, or if the data structures are identified at Block 210, then operations that are defined by the policies are performed on the print file. These operations may include renaming the print file so that it can be accessed by a user or another application, and/or making the print file accessible to other networked devices, Such as, for example, other ones of the data processing systems 110a-z or the print server 130. The print file may be posted on a WEB page (e.g., internal WEB and/or world-wide WEB) and/or the print file, or a link thereto, may be sent by email to persons who are identified by the policies. Information in the print file may be transferred to another file, and may be placed in fields of a report or organizationally structured according to data structures that are defined by the policies. For example, information in the print file may be imported into applications such as spreadsheets (e.g., Microsoft Excel), word processors (e.g., Microsoft Word), and/or databases (e.g., Microsoft Access). A history of the print files and/or operations that were performed on the print files may be electronically stored, such as in a history file.

When the print file does not satisfy the keyword search at Block 200 or the data structure at Block 210, a decision is made at Block 230 as to whether printing is allowed, such as, by determining whether the print file is capable of being printed (e.g., an available appropriate printer) and/or whether a policy defined by a user prohibits printing. If allowed, the print file is routed at Block 250 to a printer. The print file may printed by, for example, routing the print file through the network 120 or the direct connection 121 to the print server 130, where it is queued for printing, and printed by a printer 136. At Block 240, when printing is not allowed because, for example, the data processing system is configured in a stand-alone mode (i.e., not connected to the print server 130) or a policy prohibits printing, the print file may be routed to a print job queue and/or renamed based on the policies.

Accordingly, print files may be evaluated based on keyword searches and/or data structure comparisons, and the print file may be transferred and/or the contents of the print file may be modified or used to create a modified print file or other files. Consequently, although an application may be configured to provide only limited options for obtaining printed output, policies may be defined so that the print file is intercepted and modified and/or its contents used so that the application's output may more closely satisfy the user's needs.

Figure 3:
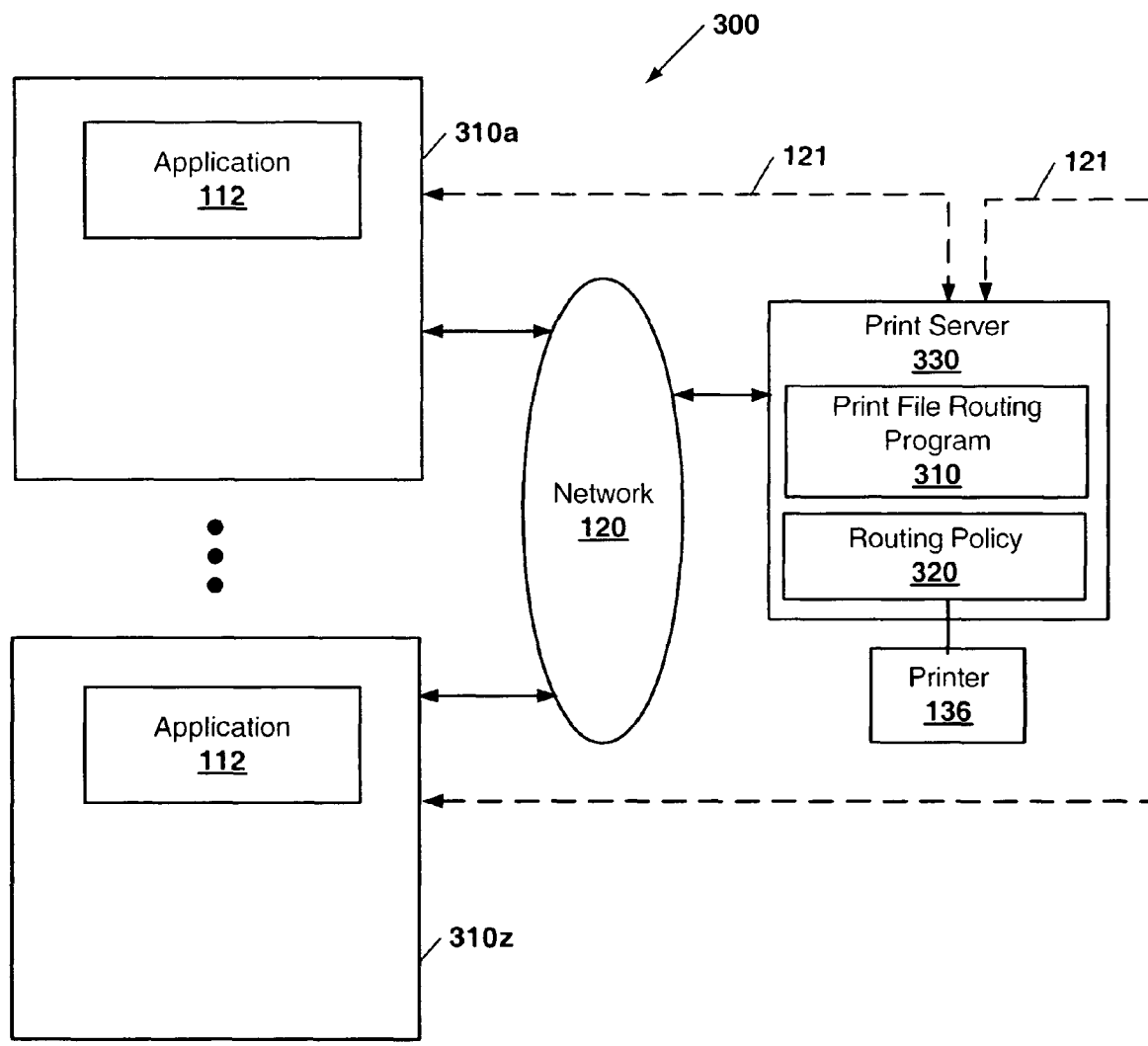
FIG. 3 is a block diagram of a computer system according to various other embodiments of the present invention.

FIG. 3 illustrates a computer system 300 according to various other embodiments of the present invention. The computer system 300 differs from the computer system 100 of FIG. 1 in that a print file routing program 310 and a routing policy 320 have been included in the print server 330, instead of in the data processing systems 310a-z. Referring to FIG. 3, information that is output by the application 112 is electronically stored as a print file, and routed through the network 120 or by the direct connection 121 to the printer server 330. The print file routing program 310 evaluates the content of the print file based on the routing policy 320, and selectively routes the print file based on the evaluation. The print file routing program 310 may operate as was described with regard to FIG. 2, the description of which is not repeated here for brevity. Accordingly, print files may be evaluated by keyword searches and/or data structure comparisons, and may be conditionally placed into a print queue of the print server 330 or conditionally removed from the print queue based on the evaluation. Print files may then be conditionally modified and/or their contents used according to policies that are defined by the routing policy 320.

Figure 4:
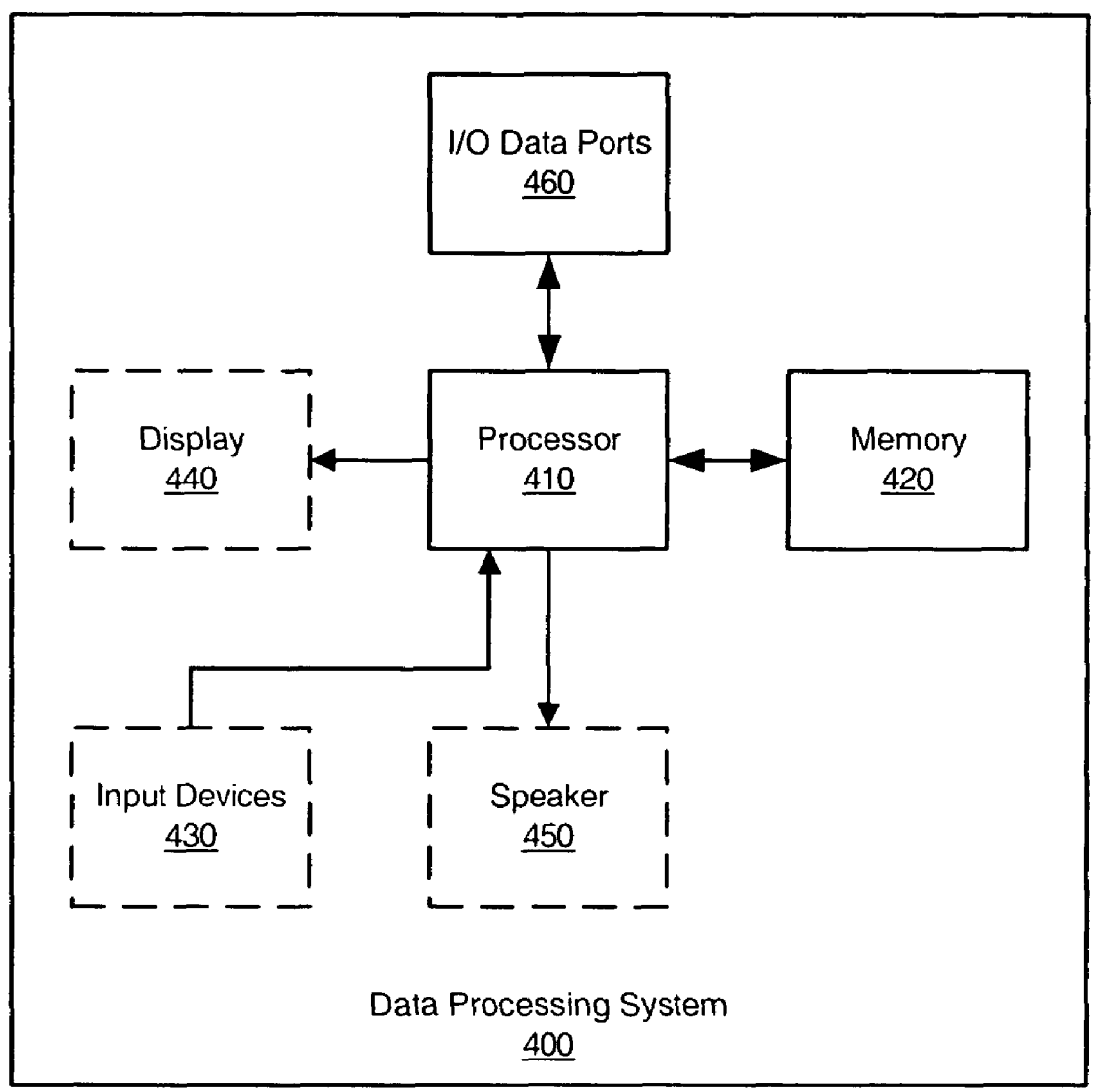
FIG. 4 is a block diagram of a data processing system according to embodiments of the present invention.

FIG. 4 illustrates an exemplary embodiment of a data processing system 400 that is suitable for use as the data processing systems 110a-z and the print server 130 of FIG. 1 and the data processing systems 310a-z and print server 330 of FIG. 3 in accordance with embodiments of the present invention. The data processing system 400 typically includes a processor 410 that communicates with a memory 420. The data processing system 400 may, optionally, include input device(s) 430 such as a keyboard or keypad, and a display 440 (illustrated in dashed lines) that also communicate with the processor 410. The data processing system 400 may further include optional devices such as a speaker 450, and an I/O data port(s) 460 that also communicate with the processor 410. The I/O data ports 460 can be used to transfer information between the data processing system 400 and another computer system, a network, and/or a peripheral device such as a printer. These components may be conventional components such as those used in many conventional data processing systems which may be configured to operate as described herein.

The processor 410 can be any commercially available or custom microprocessor. The memory 420 is representative of the overall hierarchy of memory devices containing the software and data used to implement the functionality of the data processing system 400. The memory 420 can include, but is not limited to, the following types of devices: cache, ROM, PROM, EPROM, EEPROM, flash memory, SRAM, and DRAM. The memory 420 may include several categories of software and data used in the data processing system 400: an operating system; application programs; input/output (I/O) device drivers; and data. As will be appreciated by those of skill in the art, the operating system may be any operating system suitable for use with a data processing system, such as OS/2, AIX or System390 from International Business Machines Corporation, Armonk, N.Y., Windows95, Windows98, Windows2000, Windows NT, Windows ME, Windows XP from Microsoft Corporation, Redmond, Wash., Unix or Linux. The I/O device drivers typically include software routines accessed through the operating system by the application programs to communicate with devices such as the I/O data port(s) 460 and certain memory 420 components. The application programs are illustrative of the programs that implement the various features of the data processing system 400 and preferably include at least one application which supports operations according to embodiments of the present invention.

Exemplary non-executable pseudo-code that may be implemented, for example, as a Java program is provided below that evaluates a print file based on policies that are defined in an INI file.

```
[PrintFileParser]
directory=f:\program files\winlpd\spool\m2248016
[type1]
FileName= "FILE NAME"
Ext=TXT
SearchTerm1= "FIRST SEARCH TERM"
SearchTerm2= "SECOND SEARCH TERM"
[type1.addOn1]
Row=5
Column=59
Length=40
[type2]
fileName= "FILE NAME"
ext=TXT
SearchTerm1="FIRST SEARCH TERM"
SearchTerm2="SECOND SEARCH TERM"
[type2.addOn1]
Row=5
Column=58
Length=40
[type3]
FileName="FILE NAME"
Ext=TXT
SearchTerm1="FIRST SEARCH TERM"
SearchTerm2="SECOND SEARCH TERM"
[type3.addOn1]
Row=5
Column=58
Length=40
[type4]
fileName="FILE NAME"
ext=TXT
SearchTerm1="FIRST SEARCH TERM"
SearchTerm2="SECOND SEARCH TERM"
[type4.addOn1]
Row=5
Column=58
Length=40
[type5]
fileName="FILE NAME"
ext=TXT
SearchTerm1="FIRST SEARCH TERM"
SearchTerm2="SECOND SEARCH TERM"
[type6]
fileName="FILE NAME"
ext=TXT
SearchTerm1="FIRST SEARCH TERM"
SearchTerm2="SECOND SEARCH TERM"
[type6.addOn1]
Row=5
Column=2
Length=25
[type6.addOn2]
Row=2
Column=2
Length=18
[type6.addOn3]
Row=24
Column=46
Length=16
[type7]
fileName="FILE NAME"
ext=TXT
SearchTerm1="FIRST SEARCH TERM"
[type7.addOn1]
Row=4
Column=1
Length=7
[type7.addOn2]
Row=3
Column=6
Length=8
[type7.addOn3]
Row=3
Column=96
Length=9
[type7.addOn4]
Row=2
Column=6
Length=15
[type7.addOn5]
Row=2
Column=29
Length=11
[type7.addOn6]
Row=2
Column=50
Length=2
[type7.addOn7]
Row=2
Column=64
Length=11
[type7.addOn7]
Row=60
Column=1
Length=12
[type8]
FileName="FILE NAME"
Ext=TXT
SearchTerm1="FIRST SEARCH TERM"
SearchTerm2="SECOND SEARCH TERM"
SearchTerm3="THIRD SEARCH TERM"
[type8.addOn1]
Row=6
Column=13
Length=15
[type8.addOn2]
Row=7
Column=13
Length=9
[type8.addOn3]
Row=19
Column=47
Length=11
[type9]
FileName="FILE NAME"
Ext=TXT
SearchTerm1="FIRST SEARCH TERM"
SearchTerm2="SECOND SEARCH TERM"
SearchTerm3="THIRD SEARCH TERM"
[type9.addOn1]
Row=4
Column=48
Length=37
[type10]
FileName="FILE NAME"
Ext=TXT
SearchTerm1="FIRST SEARCH TERM"
SearchTerm2="SECOND SEARCH TERM"
SearchTerm3="THIRD SEARCH TERM"
[type10.addOn1]
```

-continued

Row=4
    Column=48
    Length=37

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of routing print files in a computer system, the method comprising:
    evaluating content of at least one print file based on a routing policy, wherein the print file is configured by an application for printing on a printer device; and
    selectively routing the print file based on the evaluated content of the at least one print file to a non-printer device instead of to a printer device in response to the evaluated content of the print file.

2. The method of claim 1, wherein evaluating content of at least one print file based on a routing policy comprises searching the content of the print file for one or more keywords that are defined by the routing policy.

3. The method of claim 1, wherein evaluating content of at least one print file based on a routing policy comprises comparing the content of the print file to one or more data structures that are defined by the routing policy.

4. The method of claim 1, further comprising providing a Windows initialization (INI) file that defines the routing policy, and wherein evaluating content of at least one print file based on a routing policy comprises comparing the content of the print file to the routing policy defined by the INI file.

5. The method of claim 1, wherein selectively routing the print file comprises renaming the print file based on the content of the print file and the routing policy.

6. The method of claim 1, wherein selectively routing the print file to a non-printer device instead of to a printer device in response to the evaluated content of the print file comprises posting the print file on a WEB page.

7. The method of claim 1, wherein selectively routing the print file comprises emailing the print file to one or more users on a computer network based on the content of the print file and the routing policy.

8. The method of claim 1, wherein selectively routing the print file comprises importing information from the print file into a spreadsheet application, a word processor application, and/or a database application.

9. The method of claim 8, wherein selectively routing the print file further comprises transferring information from the print file to known fields in a report that are defined by the routing policy.

10. A computer program product for routing print files in a computer system, the computer program product comprising program code embodied in a computer-readable storage medium, the computer program code comprising:
    program code for evaluating content of at least one print file based on a routing policy, wherein the print file is configured by an application for printing on a printer device; and
    program code for selectively routing the print file based on the evaluated content of the at least one print file to a non-printer device instead of to a printer device in response to the evaluated content of the print file.

11. The computer program product according to claim 10, wherein the program code for evaluating content of at least one print file comprises program code for searching the content of the print file for one or more keywords that are defined by the routing policy.

12. The computer program product according to claim 10, wherein the program code for evaluating content of at least one print file comprises program code for comparing the content of the print file to one or more data structures that are defined by the routing policy.

13. The computer program product according to claim 10, wherein the routing policy is defined by a Windows initialization (INI) file, and wherein the program code for evaluating content of at least one print file comprises program code for comparing the content of the print file to the routing policy defined by the INI file.

14. The computer program product according to claim 10, wherein the program code for selectively routing the print file comprises program code for renaming the print file based on the content of the print file and the routing policy.

15. The computer program product according to claim 10, wherein the program code for selectively routing the print file to a non-printer device instead of to a printer device in response to the evaluated content of the print file comprises program code for posting the print file on a WEB page.

16. The computer program product according to claim 10, wherein the program code for selectively routing the print file comprises program code for emailing the print file to one or more users on a computer network based on the content of the print file and the routing policy.

17. The computer program product according to claim 10, wherein the program code for selectively routing the print file comprises program code for importing information from the print file into a spreadsheet application, a word processor application, and/or a database application.

18. The computer program product according to claim 17, wherein the program code for selectively routing the print file further comprises program code for transferring information from the print file to known fields in a report that are defined by the routing policy.

19. A method of routing print files in a computer system, the method comprising:
    searching content of a print file to identify one or more keywords that are defined by a routing policy, wherein the print file is configured by an application for printing on a printer device; and
    selectively renaming the print file based on identifying the one or more keywords in the print file instead of routing the print file to a printing device.

* * * * *